3 Sheets—Sheet 1.
E. B. FORBUSH.
Harvester.
No. 692. Reissued April 19, 1859.
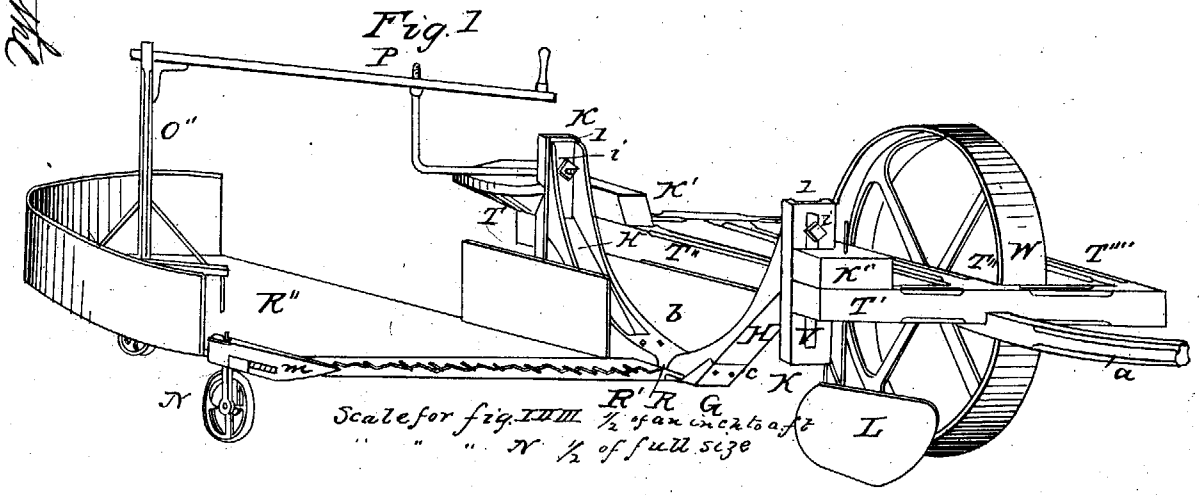
WITNESSES
George Wadsworth
Walter H. Forbush
INVENTOR
E. B. Forbush
N. PETERS, Photo-Lithographer, Washington, D. C.

3 Sheets—Sheet 2.
E. B. FORBUSH.
Harvester.
No. 692.
Reissued April 19, 1859.
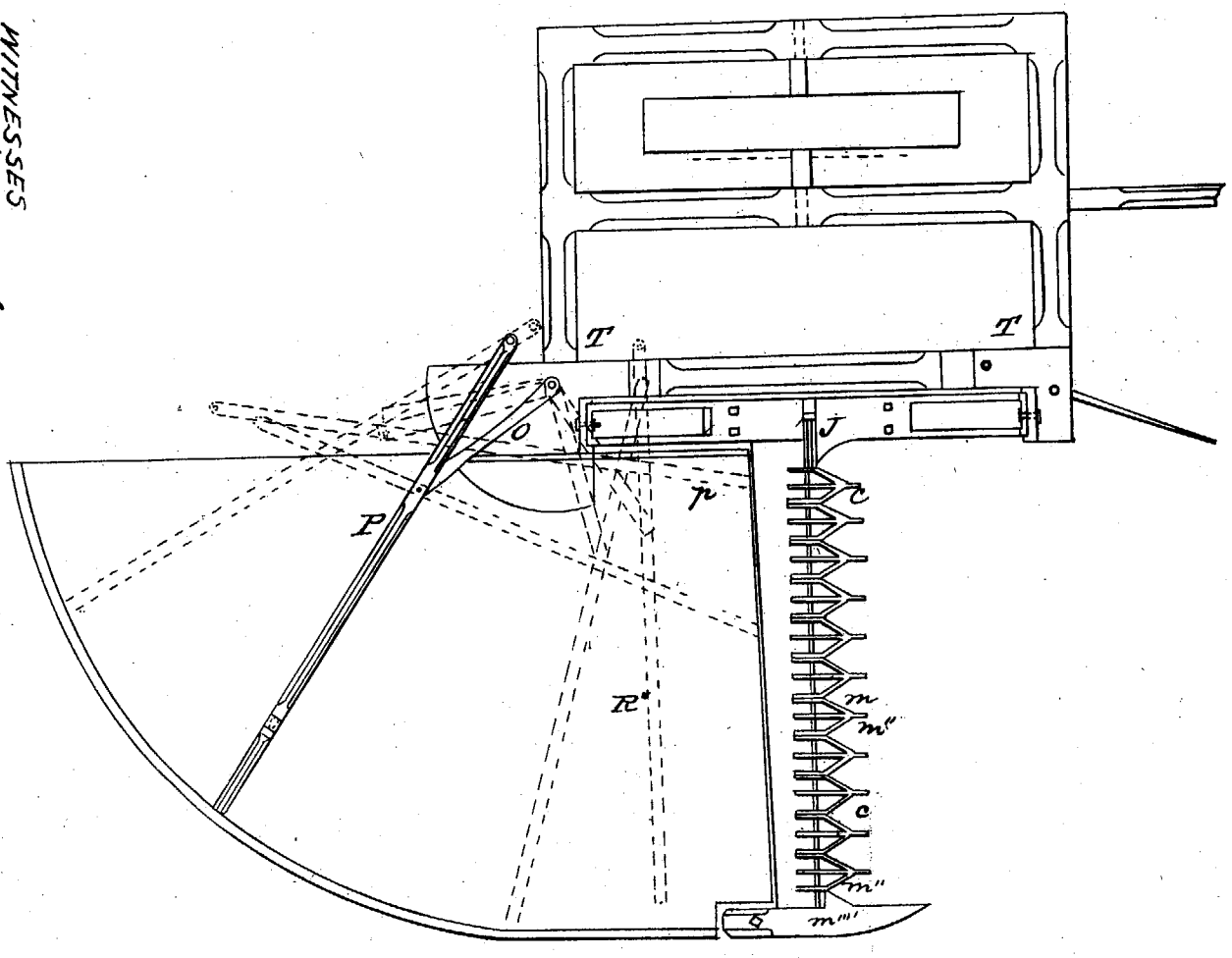
WITNESSES
George Wadsworth
W. H. Forbush
INVENTOR
Ebenezer B. Forbush
N. PETERS, Photo-Lithographer, Washington, D. C.

3 Sheets—Sheet 3.
E. B. FORBUSH.
Harvester.
No. 692. Reissued April 19, 1859.
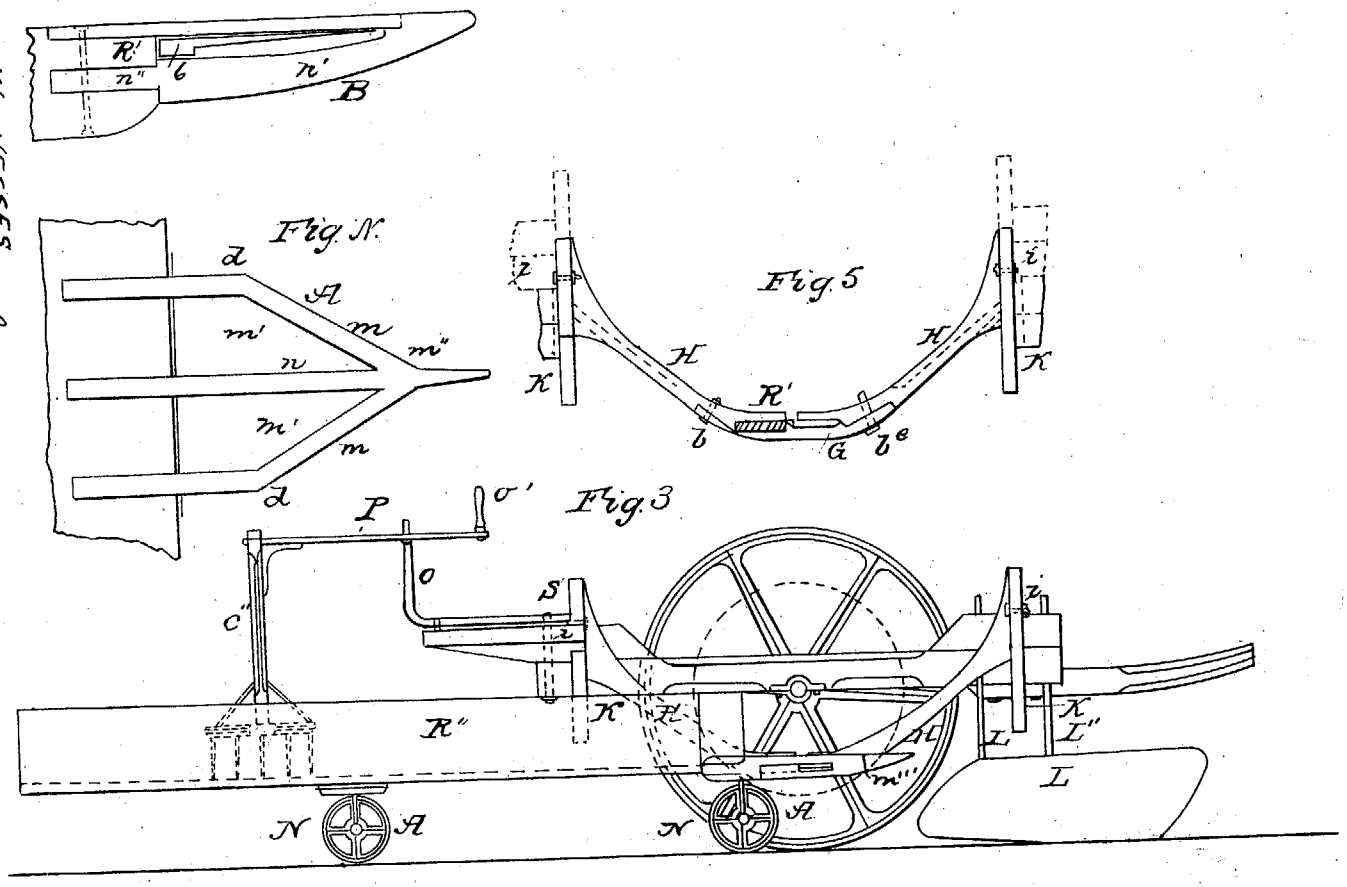
WITNESSES
George Wadsworth
W. H. Forbush
INVENTOR
Ebenezer B. Forbush
N. PETERS, Photo-Lithographer, Washington, D. C.

UNITED STATES PATENT OFFICE.

ELIAKIM B. FORBUSH, OF BUFFALO, NEW YORK.

IMPROVEMENT IN GRAIN AND GRASS HARVESTERS.

Specification forming part of Letters Patent No. 9,134, dated July 20, 1852; Reissue No. 576, dated July 8, 1856; Reissue No. 692, dated April 19, 1859.

*To all whom it may concern:*

Be it known that I, ELIAKIM B. FORBUSH, of the city of Buffalo, in the county of Erie and State of New York, have invented certain new and useful Improvements in Grain and Grass Harvesting Machines; and I do hereby declare that the following is a full and exact description thereof, reference being had to the annexed drawings and figures and letters of reference marked thereon, making a part of this specification.

To enable those skilled in the art to make and use my said improvements, I will now proceed to describe the same.

Figure I is a perspective view of my combined reaper and mower when adjusted and arranged for reaping. Fig. II is a plan or top view of the same. Fig. III is a side view of the same. Fig. IV is a plan and side view and top view of one of the guard-fingers. Fig. V is a side view of the "clamp" by which the finger-bar is supported, &c.

The main frame of the machine is composed of the longitudinal timbers T″ T‴ T⁗ and the cross-timbers T and T′. To the under side of the main frame is attached the draft-pole *a*, as shown in the drawings. The frame thus constructed is supported on a main driving-wheel, W. The cross-timbers T and T′ project inwardly and beyond the inner timber, T″, and are provided on their upper sides with the supporting-pieces K′ K″. On the inside of the projecting ends of the timbers T T′ are securely fastened the frames K K. These frames are made of cast-iron, and have recesses 1 on their inner sides for the reception of braces or arms H H, which extend downward and toward each other, (see Fig. 5,) and which, with the shoe G, form a clamp or movable frame for supporting and adjusting the finger-bar and cutters. These arms or braces H H are held in place by means of bolts *i i*, which pass through slots in the frames K K and holes in the arms H H. The slots in the frames K K are for the purpose of allowing the arms H H to be adjusted to any desired height, as well as the foundation or shoe part G of the clamp, together with the finger-bar R′ and cutters, and that, too, independently of the main frame of the machine. By "independently of the main frame of the machine" is meant that while the main frame remains in the same horizontal position as respects the ground the finger-bar and cutters may be raised and lowered relatively thereto. It will thus be seen that all that is necessary in order to adjust the finger-bar and cutters to different heights above the ground is simply to loosen the nuts on the bolts *i i*, so as to permit the braces or arms H H to be moved up or down, as the case may be, and then turn the nuts up again.

As before stated, the foundation or shoe part G is attached to the lower ends of the braces or arms H H by means of bolts *b* and $b^e$. The form of the shoe G, as well as the manner in which it is connected with the lower ends of the braces or arms H H, is fully shown in Figs. 1 and 5 of the drawings. By reference to these figures it will be seen that the formation of shoe G and the lower part of H are such that when put together a rectangular opening, R, is left between them. Into this opening R is fitted the finger-bar R′. By this construction and arrangement of parts the finger-bar can be securely held in place by compression without the necessity of passing bolts through the finger-bar.

By the above construction and arrangement of the various parts composing the clamp it is brought down to the ground and forms a runner bearing on the ground at a right line with the nadir of the driving-wheel. By this arrangement of the frame the whole machine is kept upright and rendered of easy draft when mowing, since the main weight of the machine, as a whole, rests upon the ground at two points—viz., at the bottom of the driving-wheel and runner G. As these two points are some distance apart and always in line, or nearly so, the machine is well balanced and relieved from injurious side draft and twisting of the finger-bar. It will also be noticed that the finger-bar can be quickly removed, and that when so removed the machine will remain upright, and may be as conveniently moved from field to field as if supported upon two wheels. When adjusted for mowing, the runner part G being wide and smooth on the bottom, it will slide smoothly over the loose grass and stubble which may lie in its track.

To the front of the finger-bar R′ are attached guard-fingers, through which the cutters work and against which the stalks of grain and grass are cut. These fingers are made in the form shown in Fig. IV, where A is a top view, and B a side view.

Experience has proved that in using the common straight guard in certain conditions of the grass small particles of fine grass, gummy and fibrous matter will work into the slit, in the guard and become deposited and packed on the surface of the cutters and in the slit and often accumulates to such an extent as to clog and wedge the cutters tight, or so much so as to render the machine inoperative. To afford a remedy for this difficulty I so construct my guard-finger as to leave an opening or open space, *m'*, in the top thereof, and on both sides of the central bar, *n*, through which the dirt, fine grass, and fibrous matter may escape before it becomes hard and packed between the cutters and guards. To accomplish this the upper part of the guard is constructed with a central bar, *n*, and two outer or side bars, *m m*, as fully shown in Fig. IV. These bars all meet and are united at one common point, *m''*. The under half of the guard is composed of one bar, *n'*, having a shank or projecting end, *n''*. The guard is cut or recessed out, as seen at 6, Fig. IV, for the purpose of allowing room for the cutters and cutter-bar to work. As the bar *n'*, which forms the under side or half of the guard, is under the central bar, *n*, of the upper half of the guard, it will be seen that the bars *m m* overhang the lower half of the guard—that is, extend on each side of it—and thus permit of the stalks of grain and grass being mostly severed or cut at some distance from the center line of the guard, while any stray straws or other substances which may happen to escape being cut against the outside bars, *m m*, and which may be drawn in under them, will be cut and severed against the middle bar, *n*, and thus render it almost impossible for anything to escape being cut which gets between the guard-fingers. Another great advantage of this mode of constructing guard-fingers is this: The cutting is mostly done at the greatest practicable distance from the center line of the guard-finger, (and dead-point or extreme limit of the vibration of the cutters,) thus permitting the cutters to act on the stalks when moving at their greatest velocity, or nearly so. The dirt and fibrous matter, which is apt to pass under the guard when the cutters first commenced their work, has also an opportunity to pass out at the openings *m' m'* before the cutters reach the bar *n*, or center line of the guard, and thus all danger of the cutters being clogged and obstructed is prevented. Again, those portions of each of the guards which extend in rear of the angle *d* serve the purpose of loosening and scraping up the gummy and fibrous matter which has a tendency to collect on the cutters back of the cutting-edges thereof, and as the guards are open—that is the upper sides of the guards extend back onto the finger-bar separately, as seen in Fig. II—the gummy matter which is scraped up has a free exit onto the finger-bar, or may fall out through the space between the cutters and finger-bar. Again, the construction of guards, as above described, enables the guards to brace each other when in place on the finger-bar, as shown at *c c*, Fig. II, and hence they are less liable to break and bend than if each guard were alone and unsupported by the guards on each side. It will also be seen that when the guards are in place on the finger-bar, as fully shown in Fig. II, the first guard on each end of the finger-bar braces against projections, one, *m'''*, on the divider *m''''*, and the other, J, on the brace H. These projections, in addition to affording a mutual support to the guards, also afford cutting-edges, against which the cutters act to sever any stalks of grain and grass which may chance to get on the outside of the finger or guard at either end of the finger-bar, and thus nearly all danger of the cutters being clogged, either in the divider or inner shoe, is obviated.

In constructing the guard-fingers they may be made of wrought-iron by forging, by casting from hard iron and malleable iron, by making the upper half of steel and casting the lower part, and then braze or fasten the two parts together at the points. By the use of steel for one of the parts a steel cutting-edge is obtained in the guards.

I construct my mold-board as shown at L, Fig. III, and attached to which are upright posts L' L''. These posts pass through the timbers in the frame and are free to move up or down. They cause the board to stand edgewise on the ground forward of the finger-bar and on an angle sufficient to move the mown grass which may be forward of the cutters to the inside of the clamp part of the frame. By this arrangement all obstruction from the mown grass is avoided when the machine is used as a grass cutter or mower.

To the upper side of the rear right corner of the machine is attached the arm O by means of the bolt or spindle S.

On the upper end of the right-angled arm O is placed the rake-arm P, which extends on both sides of the point where it is connected to the arm O, having on one end a handle, O', and on the other a downwardly-projecting arm, O'', which carries the rake, as shown in Fig. III. The rake can therefore be moved over the platform, to remove the grain in gavels suitable for binding, in almost every direction, since the arm P can turn on the arm O, and arm O can turn on the spindle or fulcrum-bolt S. This is an important feature in a raking device for harvesters, since the grain can be first moved back on the platform in a line parallel with the line of motion of the machine, and then turned and delivered in rear of the machine. This is done by bringing the rake over the grain as it lies on the platform, and then dropping it on the grain, so that it will occupy a position in a line at right angles to the line of motion of the machine, whereby the grain is carried back by the backward motion of the rake in a line parallel to the line of motion as far as desired, and then turned and delivered in rear of the main frame of the machine at the side of the platform. Some of the different positions of the rake, when so used, are indicated in black lines in Fig. II. Again, it is sometimes desirable to compress or gather the grain to one side of the platform before it is turned, to be moved and delivered in rear of the machine and at the side of the platform. This is done by first throwing the rake to one side of the platform, and then moving it toward the other side until the grain is sufficiently compressed to one side, and then the grain is turned and delivered in rear of the frame and at the side of the platform. Some of the positions of the rake to effect this last mode of delivery are shown in red lines in Fig. II. If preferred, however, the grain may be raked from the platform by a circular movement of the rake.

It will be noticed that by the arrangement of my raking apparatus the grain can be delivered at the necessary distance from the platform, so as to render the delivery complete, although the grain may be of different lengths. The arrangement is also such that the rake can be made to engage with the grain as it lies on the platform at different positions, thus enabling the rake to be adjusted to remove grain of different length by engaging with the center of such grain as it lies on the platform, or at any other desired point.

The rake can be operated by hand or by power applied from the machine, as may be preferred.

In Fig. I the machine is represented as being adapted for reaping grain.

To adjust the machine for cutting grass, or to be used as a mower, the movable platform R″ is detached or taken off, together with the raking apparatus, and the supporting-wheels N A and N A′ and the finger-bar and shoe G lowered, so that the shoe G and driving-wheel W will support and balance the frame in proper position. All this is but the work of a few minutes, and is so simple that any laborer can make the change.

The cutters are operated in the usual manner by suitable mechanism connected with the driving-wheel.

It will be apparent that many different ways may be devised for adjusting the finger-bar of a machine so that said machine can be used for cutting grain and grass without a change of finger-bar. I do not therefore confine myself to the particular manner shown, but propose to construct my machine with such obvious modifications as will not depart from the principle of my invention.

Having described my combined reaping and mowing machine, what I claim therein as new, and desire to secure by Letters Patent, is—

1. The device for adjusting the cutting apparatus, which may be raised or lowered without changing the height of the main frame, in combination with the finger-bar, either with or without the removable platform, substantially in the manner specified.

2. The combination of the inner projecting ends of the main frame with the adjustable cutting apparatus, substantially in the manner and for the purpose specified.

3. Supporting the clamp and finger-bar by means of the slotted iron frames K K and locking-bolts *i i*, in combination with the cross-pieces T T′ of the main frame, substantially as described.

4. The mold-board L, constructed and arranged substantially in the manner and for the purpose set forth.

5. Extending or widening out the upper part of the guard-finger, substantially as represented, by the overhanging bars *m m*, in combination with the central bar, *n′*, in the manner and for the purposes specified.

6. Arranging the three-pronged fingers above described so that they mutually brace each other in front of the finger-bar, as set forth, and are also braced and supported at each end of the cutter-bar by the projections J and *m‴*, substantially in the manner and for the purpose specified.

7. The raking apparatus, constructed and operating in the manner substantially as described.

8. The movable fulcrum upon which the rake is suspended and operated in the manner substantially as described.

ELIAKIM B. FORBUSH.

Witnesses:

GEORGE WADSWORTH,
WALTER H. FORBUSH.